United States Patent
Zhao et al.

(10) Patent No.: US 8,270,360 B2
(45) Date of Patent: Sep. 18, 2012

(54) METHOD FOR INDICATING MODULATION MODE IN HIGH SPEED DOWNLINK PACKET ACCESSING

(75) Inventors: Jing Zhao, Shenzhen (CN); He Huang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 288 days.

(21) Appl. No.: 12/734,759

(22) PCT Filed: Nov. 30, 2007

(86) PCT No.: PCT/CN2007/003396
§ 371 (c)(1),
(2), (4) Date: May 19, 2010

(87) PCT Pub. No.: WO2009/070920
PCT Pub. Date: Jun. 11, 2009

(65) Prior Publication Data
US 2010/0254315 A1  Oct. 7, 2010

(51) Int. Cl.
*H04W 4/00* (2009.01)
*H04L 12/28* (2006.01)
(52) U.S. Cl. .................................. 370/329; 370/254
(58) Field of Classification Search .............. 370/328, 370/329, 254
See application file for complete search history.

(56) References Cited

FOREIGN PATENT DOCUMENTS

| | | |
|---|---|---|
| CN | 1864373 A | 11/2006 |
| CN | 1889406 A | 1/2007 |
| CN | 1893334 A | 1/2007 |
| WO | WO 2007/000090 * | 1/2007 |
| WO | WO 2007/000095 * | 1/2007 |

* cited by examiner

*Primary Examiner* — Ronald Abelson
(74) *Attorney, Agent, or Firm* — Farjami & Farjami LLP

(57) ABSTRACT

The present invention discloses a method for indicating a modulation mode in HSDPA, comprising the following steps: a NodeB receiving capability information reported by a terminal, if determining that the terminal supports 64QAM modulation mode, determining a transmission block size, a modulation mode and code channel resource to be indicated based on an capability constraint condition and the capability information, and if the determined modulation mode is the same as a basic modulation mode satisfying requirement of the transmission block size, setting modulation mode information of a HS-SCCH as 0, otherwise setting the modulation mode information of the HS-SCCH as 1, and then sending the HS-SCCH to the terminal. Application of the present invention is compatible with a UE device which supports or does not support 64QAM high order modulation, without changing the current frame structure of the HS-SCCH, thereby achieving functional support of the 64QAM modulation mode.

11 Claims, 1 Drawing Sheet

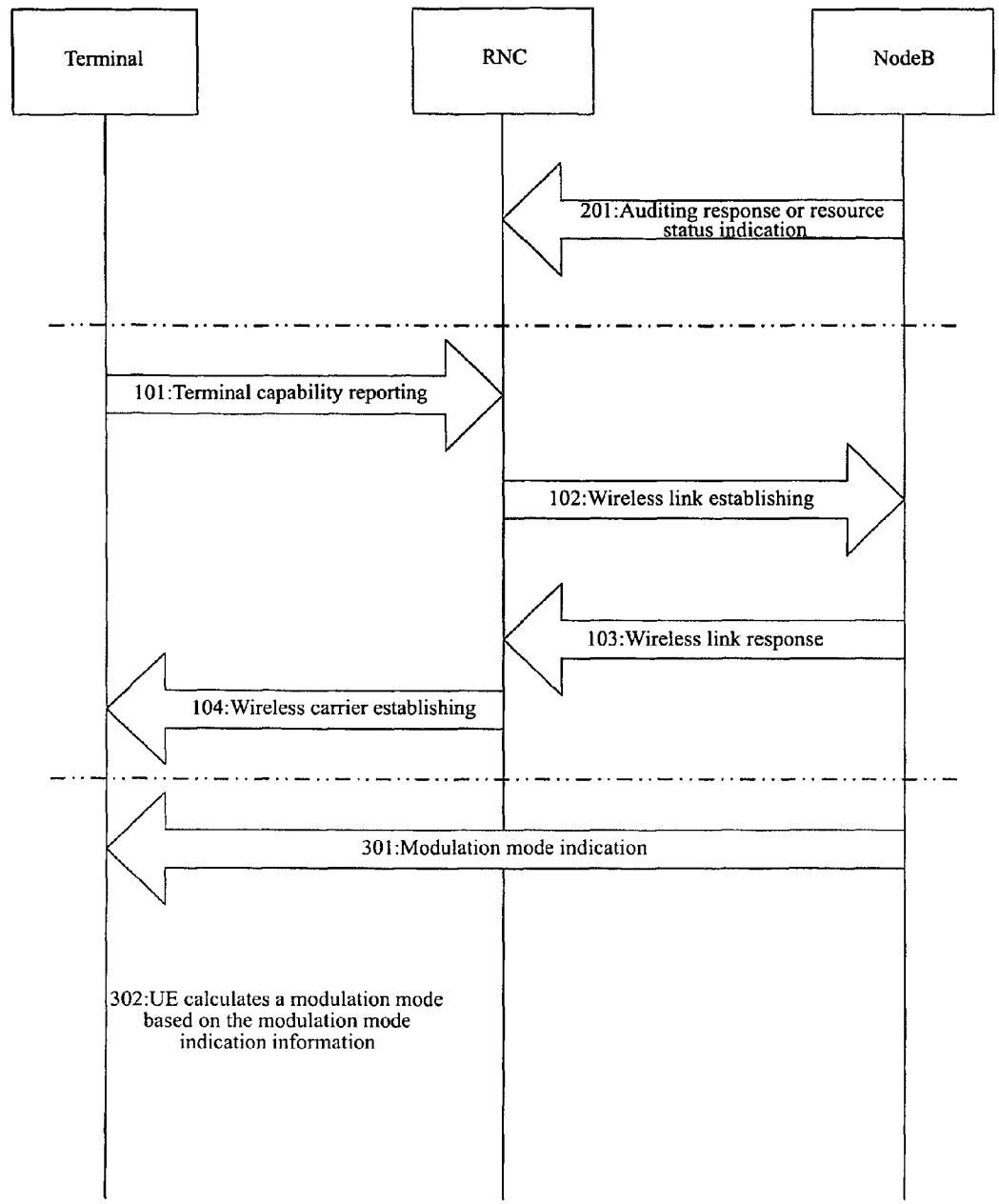

METHOD FOR INDICATING MODULATION MODE IN HIGH SPEED DOWNLINK PACKET ACCESSING

This is a U.S. national phase application which is based on, and claims priority from, PCT application Serial No. PCT/CN2007/003396, filed Nov. 30, 2007.

TECHNICAL FIELD

The present invention relates to the field of mobile communication, and more particularly, to a method for indicating the 64QAM modulation mode via High Speed Shared Control Channel (HS-SCCH) in a Time Division-Synchronous Code Division Multiple Access (TD-SCDMA) system.

TECHNICAL BACKGROUND

One of the most important characteristics of the third generation mobile communication system is the imbalance of traffics in uplink and downlink. The traffic in the downlink is generally greater than that in the uplink. In regard to such requirement characteristic, the 3GPP ($3^{rd}$ Generation Partnership Project) has introduced High Speed Downlink Packet Access (HSDPA) property into the 3G specifications. In the HSDPA property, a higher downlink packet traffic rate is provided by introducing Adaptive Modulation and Coding (AMC) technique, Hybrid Automatic Retransmission Request (HARQ) technique and relevant techniques for reducing network processing time delay, so as to improve spectrum utilization efficiency.

In the HSDPA technology for a TD-SCDMA system, new physical channels including High Speed Physical Downlink Shared Channel (HS-PDSCH), Shared Control Channel for HS-DSCH (HS-SCCH) and Shared Information Channel for HS-DSCH (HS-SICH) are introduced, and the above physical channel resources in a cell are shared through a resource pool by a number of users in the cell in a time division or code division manner. Wherein, the HS-PDSCH is used to carry service data of the users. Information such as HS-PDSCH code resources, transmission block size and modulation mode, used by each user during different transmission time intervals (TTI), is indicated on the HS-SCCH by a NodeB. And the following information is included in the HS-SCCH:
  spread spectrum code set information (8 bits): xccs,1, xccs, 2, . . . , xccs,8;
  time slot information (5 bits): xts,1, xts,2, . . . , xts,5;
  modulation mode information (1 bit): xms,1;
  transmission block size information (6 bits): xtbs,1, xtbs, 2, . . . , xtbs,6;
  hybrid automatic retransmission request process information (3 bits): xhap,1, xhap,2, xhap,3;
  redundancy version information (3 bits): xrv,1, xrv,2, xrv, 3;
  new data indication (1 bit): xnd,1;
  cyclic sequence number of the HS-SCCH (3 bits): xhcsn,1, xhcsn,2, xhcsn,3;
  identification number of a user equipment (UE) (16 bits): xue,1, xue,2, xue,16.
  Herein:
  The modulation mode information is indicated by 1 bit, where 0 represents QPSK and 1 represents 16QAM.
  The transmission block size information is indicated by 6 bits which represents an index of a corresponding transmission block in an index table of HSDPA transmission block size corresponding to a capability level to which the user equipment (UE) pertains. The respective index table of transmission block size corresponding to each capability level can be found and the table contains 64 transmission block sizes supported by the UE with the capability level. After the UE receives the information on the HS-SCCH, it will receive succeeding HS-PDSCH information on its designated code channel according to the modulation mode and transmission block size in the received information.

With the development of the technology, it becomes possible to use 64QAM in the HSDPA. However, because the modulation mode information can be indicated by only one bit, only two modulation modes can be represented such that 64QAM is unable to be represented according to the current structure. If the frame structure of the HS-SCCH is changed, a compatibility problem will be caused. Therefore, how the UE can use a planned modulation mode for the dynamic transmission block size to represent the 64QAM without changing the frame structure of the HS-SCCH on a premise that the compatibility is ensured has become a problem urgent to be solved.

SUMMARY OF THE INVENTION

An objective of the present invention is to provide a method for obtaining a modulation mode by using HS-SCCH information in a TD-SCDMA HSDPA system such that the system can indicate the 64QAM modulation mode without changing the frame structure of the HS-SCCH, in order to not only ensure compatibility but also indicate the 64QAM modulation mode.

It can be found from the information carried on the HS-SCCH described in the Technical Background that the number of code resources to be used by the UE can be known from the spread spectrum code set information and time slot information and the physical layer carrying capacity under such code resource configuration can further be known from the modulation mode. For carrying a specified transmission block size, it is required that the calculated physical layer carrying capacity is larger than the physical layer carrying requirement calculated based on the transmission block size. In reverse, a minimum modulation mode meeting the requirement can be calculated based on the physical layer carrying requirement, calculated based on the transmission block size, and the code resources, and such minimum modulation mode satisfying the transmission block size, which is calculated based on the transmission block size and code channel resource information, is referred to herein as basic modulation mode. Since the specific calculation method is not emphasized in the present invention, it will not be described in detail herein.

The present invention provides a method for indicating a modulation mode in high speed downlink packet access, comprising the following steps:
  a NodeB receiving capability information reported by a terminal, if determining that the terminal supports 64QAM modulation mode, determining a transmission block size, a modulation mode and code channel resource to be indicated based on an capability constraint condition and the capability information, and if the determined modulation mode is the same as a basic modulation mode satisfying requirement of the transmission block size, setting modulation mode information of a shared control channel for high speed downlink shard channel as 0, otherwise setting the modulation mode information of the shared control channel for high speed downlink shard channel as 1, and then sending the shared control channel for high speed downlink shard channel to the terminal.

The method further comprises:

if the NodeB determines that the terminal does not support the 64QAM modulation mode, then setting the modulation mode information of the shared control channel for high speed downlink shard channel according to a modulation mode determined by the capability information, setting the modulation mode information as 0 if the modulation mode is QPSK, or setting the modulation mode information as 1 if the modulation mode is 16QAM, and then sending the shared control channel for high speed downlink shard channel to the terminal.

The method further comprises:

after the terminal which supports the 64QAM receives the shared control channel for high speed downlink shard channel, calculating the basic modulation mode satisfying the requirement of the transmission block size received, and taking the basic modulation mode as a modulation mode of the terminal if the read modulation mode information is 0, or taking a modulation mode which is one lever higher than the basic modulation mode as the modulation mode of the terminal if the read modulation mode information is 1, for reception.

The method further comprises:

after the terminal which does not support the 64QAM receives the shared control channel for high speed downlink shard channel, taking QPSK modulation mode as the modulation mode of the terminal if the read modulation mode information is 0, or taking 16QAM modulation mode as the modulation mode of the terminal if the read modulation mode information is 1, for reception.

The capability information reported by the terminal includes information on whether the terminal supports 64QAM high order modulation.

The capability constraint condition includes:

the code channel resource determined by the NodeB are able to meet the requirement of carrying the specified transmission block size under the selected modulation mode; and difference between the modulation mode selected by the NodeB and a minimum modulation mode calculated based on the specified code channel resource and the transmission block size is at most one level.

The basic modulation mode is a minimum modulation mode satisfying the transmission block size, which is calculated based on the transmission block size and the code channel resource information.

The method for indicating a modulation mode via the HS-SCCH in a TD-SCDMA system provided by the present invention is compatible with a UE device which supports or does not support 64QAM high order modulation, without changing the current frame structure of the HS-SCCH, thereby achieving functional support of the 64QAM modulation mode.

BRIEF DESCRIPTION OF THE DRAWING

FIG. 1 illustrates a flow chart of a method for indicating a modulation mode in accordance with the present invention.

PREFERRED EMBODIMENTS OF THE INVENTION

Technical scheme of the present invention described herein will be further described in detail below in conjunction with specific embodiments and the accompanying drawings.

The flow of indicating a modulation mode via the HS-SCCH in a TD-SCDMA system comprises the following steps:

Step 11: a NodeB selects information such as transmission block size, modulation mode and code channel resource according to the information such as Channel Quality Indication (CQI) reported by a UE, and then fills in the HS-SCCH and sends it to the UE;

Step 22: after receiving the HS-SCCH, the UE determines the modulation mode used by the NodeB based on the code channel resource information and the transmission block size information.

In the Step 11, for a UE which does not support 64QAM, the NodeB still uses an original method for indicating a modulation mode, in which the value of the modulation mode information is set as 0 or 1 (0 represents QPSK and 1 represents 16QAM) to indicate whether the modulation mode is QPSK or 16QAM.

In the Step 11, for a UE which supports 64QAM, the NodeB uses the method for indicating a modulation mode in accordance with the present invention, in which the modulation mode information is set flexibly on the premise that the size of the modulation mode information is maintained as 1 bit, such that the modulation mode information can indicate QPSK, 16QAM or 64QAM.

The modulation mode information (1 bit) in the HS-SCCH information is kept, but definition of it is no longer that 0 represents QPSK and 1 represents 16QAM, but that 0 represents a calculated basic modulation mode and 1 represents a modulation mode which is one level higher than the calculated basic modulation mode.

Herein, the NodeB selects the transmission block size (TB Size), the modulation mode and the used HS-PDSCH code channel resource according to the information such as the CQI reported by the UE and the amount of data to be transmitted.

The following constraint relations have to be met when the NodeB selects the transmission block size, the code channel resource and the modulation mode:

the selected code channel resource is able to meet the requirement for carrying the specified transmission block size under the selected modulation mode; and the selected modulation mode is at most one level higher than the minimum modulation mode calculated based on the specified code channel resource and the transmission block size.

In the Step 22, after the UE which supports the 64QAM receives the HS-SCCH, it calculates the basic modulation mode (the lowest level modulation mode that satisfies the transmission block size in the case of specified code channel resource) required for carrying the transmission block size based on the transmission block size and the assigned code channel resource; after the UE calculates the required basic modulation mode, it performs adjustment according to the modulation mode information in the HS-SCCH information: if the value of the modulation mode information is 0, it indicates that the basic modulation mode is used, and if the value of the modulation mode information is 1, it indicates that the modulation mode which is one level higher than the calculated basic modulation mode is used.

In the Step 22, after the UE which does not support 64QAM receives the HS-SCCH, it still comprehends the modulation mode information according to the original method: if the value of the modulation mode information is 0, it indicates that the QPSK modulation mode is used, and if the value of the modulation mode information is 1, it indicates that the 16QAM modulation mode is used.

Taking a signaling interaction flow of a HSDPA service terminal and a network side in a TD-SCDMA system as an example, an application example of the technical scheme of the present invention is described below.

As shown in FIG. 1, a segment of the signaling interaction flow of the HSDPA service includes the following steps:

Step 301: the NodeB sends the HS-SCCH to the UE to indicate relevant information such as code channel resource, transmission block size and modulation mode;

Step 302: after the UE receives the HS-SCCH, it calculates a modulation mode to be used based on the assigned transmission block information, code channel information and modulation mode information.

Before the Step 301, the terminal UE may report its capability information, including information on whether the terminal supports 64QAM, to the NodeB according to the current terminal capability information reporting flow and link establishing flow.

In the Step 301, when assigning the resource, the NodeB fills in the HS-SCCH with the code channel resource information, the transmission block size and the modulation mode information.

Herein, the NodeB determines the code channel resource information and the transmission block size that can satisfy the traffic flow, and may calculate the corresponding modulation mode based on the code channel resource and the transmission block size.

Herein, if the NodeB decides to use the modulation mode which is one level higher than the basic modulation mode according to the current channel quality, then it fills in the modulation mode information with 1; if the NodeB decides to use the basic modulation mode, then it fills in the modulation mode information with 0.

In the Step 302, after receiving the HS-SCCH information, the UE calculates the basic modulation mode based on the transmission block size and code channel resource information, and acquires the modulation mode actually used by the NodeB based on the modulation mode information: if the modulation mode information is 0, it is determined that the basic modulation mode is used; if the modulation mode information is 1, it is determined that the modulation mode which is one level higher than the basic modulation mode is used.

For example, if the basic modulation mode calculated by the UE is 16QAM, and the modulation mode information is 0, then the 16QAM modulation mode is used, while if the modulation mode information is 1, then 64QAM is used.

Similarly, if the basic modulation mode calculated by the UE is QPSK, and the modulation mode information is 0, then the QPSK modulation mode is used, while if the modulation mode information is 1, then 16QAM is used.

Using the method described above, the UE can obtain the modulation mode information without changing the frame structure of the HS-SCCH in the scenario where 64QAM is used.

INDUSTRIAL APPLICABILITY

The method for indicating a modulation mode via the HS-SCCH in a TD-SCDMA system provided in the present invention can be compatible with a UE which supports or does not support the 64QAM high order modulation, without changing the current frame structure of HS-SCCH, thereby achieving functional support of the 64QAM modulation mode.

What we claim is:

1. A method for indicating a modulation mode in high speed downlink packet access, comprising the following steps:

a NodeB receiving capability information reported by a terminal, when determining that the terminal supports 64QAM modulation mode, determining a transmission block size, a modulation mode and code channel resource to be indicated based on an capability constraint condition and the capability information, and when the determined modulation mode is the same as a basic modulation mode which is a minimum modulation mode satisfying requirement of the transmission block size, setting modulation mode information of a shared control channel for high speed downlink shared channel as 0 to indicate taking the basic modulation mode as the modulation mode of the terminal, when the determined modulation mode is one level higher than the basic modulation mode, setting the modulation mode information of the shared control channel for high speed downlink shared channel as 1 to indicate taking a modulation mode which is one level higher than the basic modulation mode as the modulation mode of the terminal, and then sending the shared control channel for high speed downlink shared channel to the terminal.

2. The method according to claim 1, further comprising:
if the NodeB determines that the terminal does not support the 64QAM modulation mode, then setting the modulation mode information of the shared control channel for high speed downlink shared channel according to a modulation mode determined by the capability information, setting the modulation mode information as 0 if the modulation mode is QPSK, or setting the modulation mode information as 1 if the modulation mode is 16QAM, and then sending the shared control channel for high speed downlink shared channel to the terminal.

3. The method according to claim 1, further comprising:
after the terminal which supports the 64QAM receives the shared control channel for high speed downlink shared channel, calculating the basic modulation mode satisfying the requirement of the transmission block size received, and taking the basic modulation mode as a modulation mode of the terminal if the read modulation mode information is 0, or taking a modulation mode which is one level higher than the basic modulation mode as the modulation mode of the terminal if the read modulation mode information is 1, for reception.

4. The method according to claim 3, further comprising:
after the terminal which does not support the 64QAM receives the shared control channel for high speed downlink shared channel, taking QPSK modulation mode as the modulation mode of the terminal if the read modulation mode information is 0, or taking 16QAM modulation mode as the modulation mode of the terminal if the read modulation mode information is 1, for reception.

5. The method according to claim 3, wherein the capability information reported by the terminal includes information on whether the terminal supports 64QAM high order modulation.

6. The method according to claim 1, wherein the capability constraint condition includes:
the code channel resource determined by the NodeB are able to meet the requirement of carrying the specified transmission block size under the selected modulation mode; and
difference between the modulation mode selected by the NodeB and a minimum modulation mode calculated based on the specified code channel resource and the transmission block size is at most one level.

7. The method according to claim 3, wherein the basic modulation mode is a minimum modulation mode satisfying the transmission block size, which is calculated based on the transmission block size and the code channel resource information.

8. The method according to claim 2, further comprising:
after the terminal which supports the 64QAM receives the shared control channel for high speed downlink shared channel, calculating the basic modulation mode satisfying the requirement of the transmission block size received, and taking the basic modulation mode as a modulation mode of the terminal if the read modulation mode information is 0, or taking a modulation mode which is one level higher than the basic modulation mode as the modulation mode of the terminal if the read modulation mode information is 1, for reception.

9. The method according to claim 8, further comprising:
after the terminal which supports the 64QAM receives the shared control channel for high speed downlink shared channel, calculating the basic modulation mode satisfying the requirement of the transmission block size received, and taking the basic modulation mode as a modulation mode of the terminal if the read modulation mode information is 0, or taking a modulation mode which is one level higher than the basic modulation mode as the modulation mode of the terminal if the read modulation mode information is 1, for reception.

10. The method according to claim 8, wherein the capability information reported by the terminal includes information on whether the terminal supports 64QAM high order modulation.

11. The method according to claim 8, wherein the basic modulation mode is a minimum modulation mode satisfying the transmission block size, which is calculated based on the transmission block size and the code channel resource information.

* * * * *